United States Patent
Park (10) Patent No.: US 9,894,488 B2
(45) Date of Patent: *Feb. 13, 2018

(54) OPEN TYPE POI SERVICE SYSTEM USING SNS METHOD AND METHOD THEREOF

(71) Applicant: INTELLECTUAL DISCOVERY CO., LTD., Seoul (KR)

(72) Inventor: Yong Kwan Park, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,253

(22) Filed: Nov. 22, 2016

(65) Prior Publication Data

US 2017/0078853 A1    Mar. 16, 2017

Related U.S. Application Data

(63) Continuation of application No. 13/997,530, filed as application No. PCT/KR2011/007105 on Sep. 27, 2011, now Pat. No. 9,537,961.

(30) Foreign Application Priority Data

Dec. 29, 2010    (KR) .................. 10-2010-0138030

(51) Int. Cl.
| | |
|---|---|
| *H04L 29/08* | (2006.01) |
| *H04W 4/04* | (2009.01) |
| *H04L 29/06* | (2006.01) |
| *G06Q 30/02* | (2012.01) |
| *G09B 29/00* | (2006.01) |
| *H04W 4/02* | (2009.01) |

(52) U.S. Cl.
CPC ............. *H04W 4/04* (2013.01); *G06Q 30/02* (2013.01); *G09B 29/007* (2013.01); *H04L 67/18* (2013.01); *H04L 67/22* (2013.01); *H04L 69/08* (2013.01); *H04W 4/028* (2013.01)

(58) Field of Classification Search
CPC .......... H04L 69/08; H04L 67/22; H04L 67/18
USPC ................................. 709/203, 204
See application file for complete search history.

(56) References Cited

U.S. PATENT DOCUMENTS

| | | |
|---|---|---|
| 8,775,570 B2 | 7/2014 | Sandholm |
| 2009/0047972 A1 | 2/2009 | Neeraj |
| 2009/0234579 A1 | 9/2009 | Wang et al. |
| 2013/0097162 A1 | 4/2013 | Corcoran et al. |

FOREIGN PATENT DOCUMENTS

| | | |
|---|---|---|
| CN | 101672910 | 3/2010 |
| JP | 2008040869 A | 2/2008 |
| WO | 2010006062 A1 | 1/2010 |

OTHER PUBLICATIONS

International Search Report issued in International Application No. PCT/KR2011/007105 dated Apr. 16, 2012.

*Primary Examiner* — Adnan Mirza
(74) *Attorney, Agent, or Firm* — Sughrue Mion, PLLC (57) ABSTRACT

Disclosed are an open type POI service system using an SNS method and a method thereof. The open type POI system includes an SNS media studio server which opens a POI to a user and registers an interest location designated by a user as an open type POI. Therefore, the SNS media studio server includes a database which stores an open type POI related to a user, and supplies the open type POI to another user who is related to the user by connection of the open type POI and SNS.

11 Claims, 6 Drawing Sheets

401 ~ 😃 : static POI
402 ~ 👤 : dynamic POI
403 ~ Ⓣ : content POI

OPEN TYPE POI SERVICE SYSTEM USING SNS METHOD AND METHOD THEREOF

CROSS-REFERENCE TO RELATED APPLICATIONS

This application is a continuation of U.S. patent application Ser. No. 13/997,530 filed on Jun. 24, 2013, which is the National Stage Entry of International Application No. PCT/KR2011/007105 filed on Sep. 27, 2011, and claims priority to and the benefit from Korean Application No. 10-2010-0138030, filed on Dec. 29, 2010, all of which are incorporated herein by reference in their entirety.

BACKGROUND

Field

The present invention relates to an open-type POI service system and method where a user directly generates map data and shares the map data with another user based on an SNS.

Discussion of the Background

As communication technologies have developed, devices used when an individual forms social relations through a web have been gradually advanced. Particularly, an SNS (Social Networking Service) that is based on the interactivity of a web and the active participation of users has drawn attention. Meanwhile, the users of the day use map information (including traffic information) through various media such as a smart phone, a web, a navigation, and the like, but the users, as receivers, obtain original data provided from an information provider in a uni-direction. However, in the current IT market, an SNS has been considered as a great issue and has been utilized in most IT services regardless of the characteristics of services. This means that customers do not prefer to passively do information-related activities any longer.

Therefore, a role of a user as a provider is reconsidered in the market related to map information, and there is a need for enhancement of a service that enables a user to directly generate data and provides data.

SUMMARY

An aspect of the present invention provides an open-type POI service system and method that may open a POI on a map to a user so that the user may directly generate a POI.

Another aspect of the present invention also provides an open-type POI service system and method that may extend a structure of a POI to a structure that provides a connection with another user based on an SNS.

Another aspect of the present invention also provides an open-type POI service system and method that may provide a POI on a map as a location having real-time data.

Another aspect of the present invention also provides an open-type POI service system and method that may extend a POI to an object that forms a relationship with a user so as to enable the POI to be a place for a predetermined purpose and an individual including a location.

Another aspect of the present invention also provides an open-type POI service system and method that may provide a service by forming a relationship to follow real-time data associated with a POI.

Provided is an open-type POI (point of interest) service system, including an SNS media studio server to open a POI to a user and to register a location of interest designated by the user as an open-type POI. In this instance, the SNS media studio server includes a database to store an open-type POI to be associated with the user, and supplies the open-type POI to another user who is related to the user by connecting the open-type POI with an SNS (social network service).

According to an aspect of an exemplary embodiment, the open-type POI includes at least one of a static POI of which a location of interest is fixed, a dynamic POI of which a location of interest varies, and a content POI of which a location of interest is located in a road or near the road. Here, the static POI corresponds to at least one POI that is selected by the user from among the opened POIs or corresponds to at least one POI of which POI related information is changed or added by the user from among the opened POIs. The location of interest of the dynamic POI corresponds to a location of another user who allows opening of the location to the user. Also, the content POI corresponds to a reference point to collect traffic information associated with the road based on the location of interest or to provide the information to the user.

According to another aspect of an exemplary embodiment, the SNS media studio server directly receives an input of traffic information associated with the road from the user, and connects the traffic information with the content POI so as to register the information as an open-type POI.

According to another aspect of an exemplary embodiment, the SNS media studio server collects traffic information associated with the road on the Internet, and connects the traffic information with the content POI so as to register the information as an open-type POI.

According to another aspect of an exemplary embodiment, the SNS media studio server automatically registers the content POI with respect to at least one specific point from among an accident black spot on the road, a region for which TPEG data does not exist, and a chronically congested section.

According to another aspect of an exemplary embodiment, the SNS media studio server provides, as public information, traffic information associated with at least one specific point from among an accident black spot on the road, a region for which TPEG data does not exist, and a chronically congested section, to users located in the specific point or located within a predetermined radius based on the specific point.

According to another aspect of an exemplary embodiment, the SNS media studio server registers the open-type POI by connecting POI related information with the open-type POI when the POI related information is input by the user with respect to the open-type POI in at least one form of a text, an image, a video, and a voice.

According to another aspect of an exemplary embodiment, the SNS media studio server performs storing in the database after verifying at least one of the user, the open-type POI, and the POI related information.

According to another aspect of an exemplary embodiment, the SNS media studio server provides the open-type POI to the other user based on SNS-based information of the other user, in response to a request of the user or a request of the other user.

According to another aspect of an exemplary embodiment, the open-type POI is shared with a different type of communication terminal that is related to the user or the other user.

Provided is an open-type POI service system including an SNS media studio server to open a POI to a user and to register, as an open-type POI, at least one interest POI which the user is interested in. In this instance, the SNS media studio server includes a data base to store the open-type POI, and the open-type POI is shared with a different type of communication terminal related to the user.

According to an aspect of an exemplary embodiment, the SNS media studio server stores the open-type POI in the database when the user registers the open-type POI using a first communication terminal, and provides the open-type POI to a second communication terminal that is in a type different from the first communication terminal in response to a request of the user.

According to another aspect of an exemplary embodiment, the SNS media studio server provides the open-type POI to another user who is related to the user by connecting the open-type POI with an SNS. In this instance, the open-type POI is shared with a different type of communication terminal related to the other user.

Provided is an information registration device that connects to an SNS media studio server, and registers, in the SNS media studio server as an open-type POI, a location of interest designated by the user based on POIs opened by the SNS media studio server or at least one interest POI which the user is interested in. In this instance, the open-type POI is stored in the SNS media studio server to be associated with the user, and is provided to another user related to the user through connection with an SNS.

Provided is an open-type POI service method, including a POI opening step to open a POI to a user, a POI registration step to register a location of interest designated by the user as an open-type POI, and a POI sharing step to provide the open-type POI to another user related to the user by connecting the open-type POI with an SNS. In this instance, the POI registration step registers at least one POI related information from among a text, an image, a video, and a voice to be associated with the open-type POI.

Provided is an open-type POI service method, including a POI opening step to open a POI to a user, a POI registration step to register, as an open-type POI, at least one interest POI which the user is interested in, and a POI storing step to store the open-type POI in a database to be associated with the user. In this instance, the open-type POI is shared with a different type of communication terminal related to the user.

According to the present invention, a system and method opens a POI on a map to a user and enables the user to directly generate a POI and thus, any one may be able to generate a POI in a horizontal structure through an open API and a personalized map service may be provided through an extended POI layer.

According to the present invention, a system and method extends a POI to an object that forms a relationship with a user and thus, may provide an SNS structure that provides a connection with another user based on a POI by forming a relationship between an individual and a place as opposed to forming a relationship between individuals.

According to the present invention, a system and method may collect more reliable data in real-time by utilizing a POI on a map as a location having real-time data, and may provide real-time data of a POI based on an SNS.

According to the present invention, a system and method may provide, through an extended POI structure, a service that is based on an SNS and most accurately and quickly displays a database having a feature of real-time.

DETAILED DESCRIPTION OF THE ILLUSTRATED EMBODIMENTS

Hereinafter, embodiments of the present invention will be described in detail with reference to attached drawings.

Figure 1:
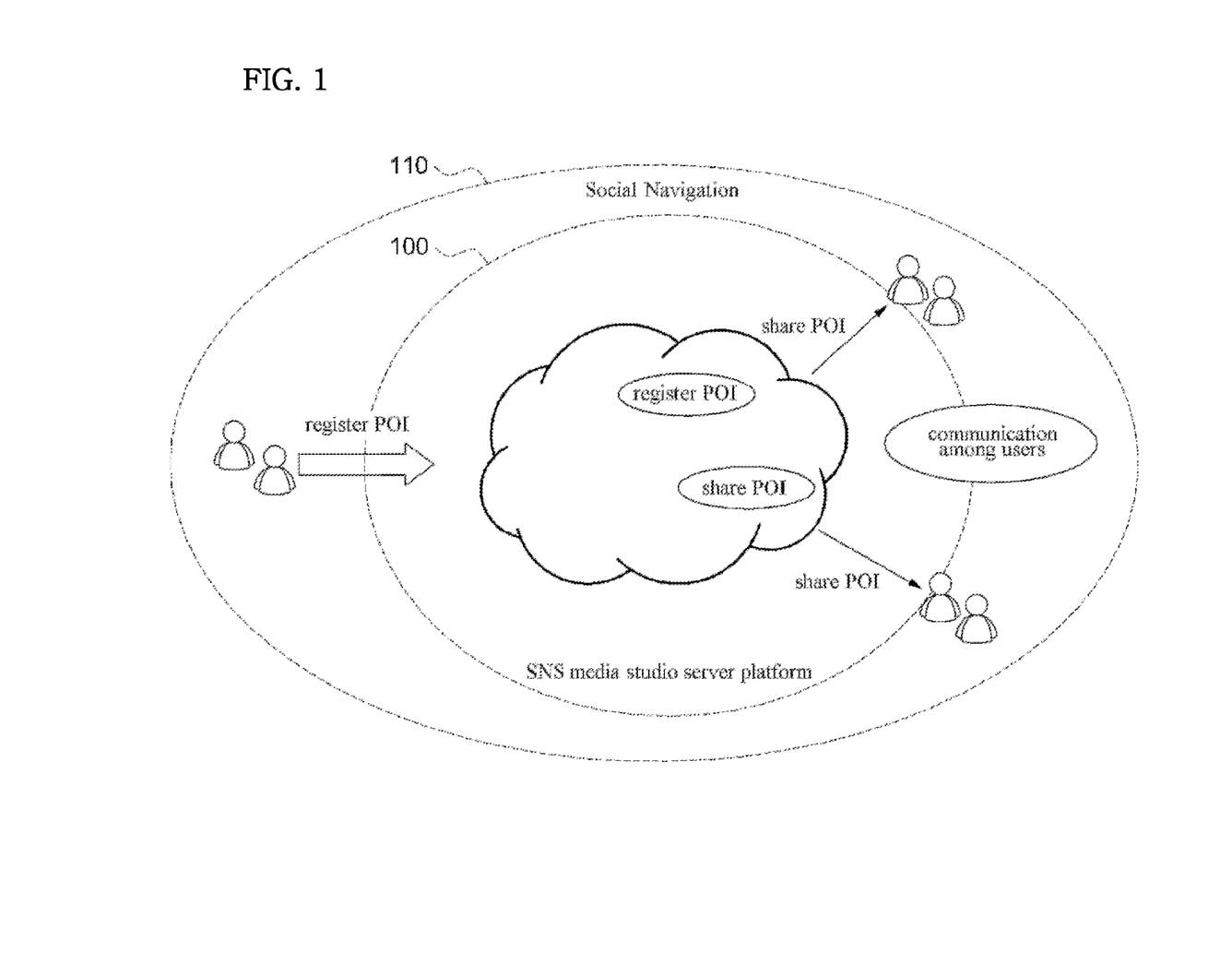
FIG. 1 is a diagram illustrating an SNS media studio platform where a user directly generates a POI and shares with another user according to an embodiment of the present invention.

FIG. 1 is a diagram illustrating an SNS media studio platform according to an embodiment of the present invention.

FIG. 1 illustrates an SNS media studio 100 that provides an SNS-based POI service. Here, the SNS media studio 100 refers to a platform where an individual generates map data, shares the map data with another user, and freely has communication. The SNS media studio 100 may support a function of opening map data displayed on a map to a user, a function of enabling an individual to directly generate a POI based on opened map data, and a function of sharing a POI of an individual with another user based on an SNS.

The present embodiment may enable any one to generate and register a POI in a horizontal structure through an open API (open application programming interface), and may provide a personalized map service through a POI layer generated by an individual. In addition, the POI may be extended to an object that forms a relationship with an individual, and a relationship between an individual and a place (that is, POI) is formed, and thus, an advanced concept social network may be formed.

Therefore, the present invention may define a concept of a social navigation 110 of an SNS structure that provides a connection with another user using a POI as a medium through an SNS-based POI service supported by the SNS media studio 100.

Figure 2:
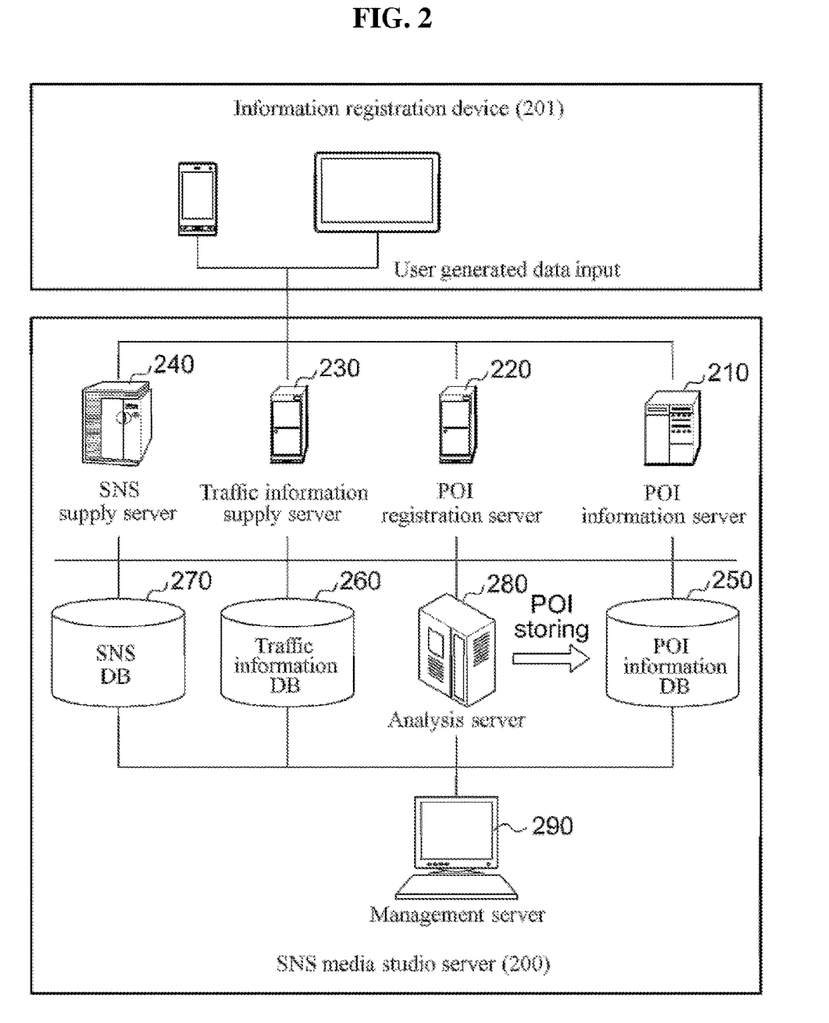
FIG. 2 is a block diagram illustrating an entire configuration of an open-type POI service system for providing a social navigation service according to an embodiment of the present invention.

FIG. 2 is a block diagram illustrating an entire configuration of an open-type POI service system for providing a social navigation service according to an embodiment of the present invention.

As illustrated in FIG. 2, the open-type POI service system according to an embodiment of the present invention may be configured of an SNS media studio server 200 that acts as a platform of FIG. 1. The SNS media studio server 200 performs an overall POI service based on an SNS. The SNS media studio server 200 provides a web service associated with the POI service, and an individual may register, manage, and share a POI by connecting to the web service provided by the SNS media studio server 200 through an information registration device 201 that supports a communication environment. Here, the information registration device 201 corresponds to a device for inputting user-generated data for generating a POI into the SNS media studio server 200, and may inclusively indicate all communication terminal that is capable of connecting to the SNS media studio server 200 such as a PC, communication-type navigation device, a smart phone, and the like.

Particularly, the SNS media studio server 200 may include a POI information server 210, a POI collect server 220, a traffic information collect server 230, an SNS supply server 240, a POI information database 250, a traffic information database 260, an SNS database 270, an analysis server 280, and a management server 290.

Figure 3:
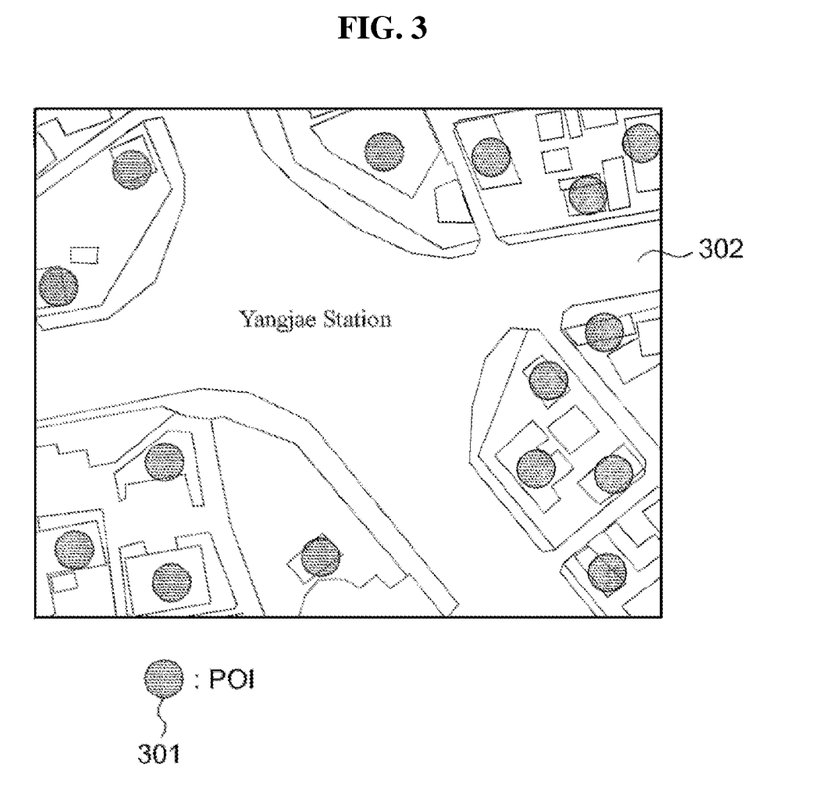
FIG. 3 is a diagram illustrating a user communication (Open API) that opens map data displayed on a map screen according to an embodiment of the present invention.

The POI information server 210 opens map data, particularly, a POI, displayed on a map to a user. Here, the POI may correspond to data for displaying main facilities disclosed on a map screen on a digital map, and may include text information such as a name, an address, a telephone number, and the like. The POI information server 210 may provide a user communication environment (i.e., an open API) to enable a user to generate a POI. For example, the POI information server 210, as illustrated in FIG. 3, may open map data including a POI 301 corresponding to each facility and a road 302 through user communication.

The POI collect server 220 collects an open-type POI generated based on user-generated data input through the information registration device 201. The POI collect server 220 recognizes a location of interest designated by the user in map data opened by the POI information server 210, and collects the recognized the location of interest as an open-type POI. In the present embodiment, the open-type POI may include at least one of a static POI, a dynamic POI, and a content POI. Here, the static POI corresponds to a POI of which a location of interest designated by the user is fixed, and indicates all existing POIs displayed on a map. Particularly, the static POI corresponds to a POI selected by the user as an interest POI which the user is interested in, or a POI of which POI related information (e.g., a name and the like) is changed or added. Referring to FIG. 3, the user may generate a static POI by selecting the POI 301 associated with a predetermined facility through user communication. Also, the dynamic POI corresponds to a POI of which a location of interest designated by the user is dynamically changed, and indicates a POI that is designated to be a location of another user that allows opening of the location to the user. For example, when the user requests POI registration with respect to a location of a predetermined friend through user communication, the location of the corresponding friend may be generated to be a dynamic POI displayed on a map. The content POI corresponds to a POI of which a location of interest designated by the user is located on a road or near the road. In other words, the content POI is generated by setting a virtual point on a road, the virtual point being a location where circumjacent traffic information is collected, or may provide the user with circumjacent traffic information based on the virtual point, that is, may indicate a point of interest as a reference for providing various contents. Traffic information is information associated with a time and thus, the content POI may be utilized as a location for collecting and providing real-time traffic information. Referring to FIG. 3, the user may generate a content POI by setting a point on the road 302 through user communication. The content POI may be manually or automatically set. In the case of automatic setting, at least one specific point from among an accident black spot, a region for which TPEG (Transport Protocol Expert Group) data does not exist (e.g., an interchange ramp and the like), and a chronically congested section may be automatically generated as a content POI. In this example, the content POI may be utilized as public information for users located in a corresponding specific point or users located within a predetermined radius based the predetermined point. In addition, the POI collect server 220 may collect POI related information input by the user with respect to an open-type POI. In this example, the POI related information may be input in at least one form of a text, an image, a video, and a voice. Also, the POI collect server 220 may collect POI related information that is associated with an open-type POI on the Internet in addition to POI related information that is directly input by the user.

The traffic information collect server 230 collects traffic information associated with a road. Here, the traffic information inclusively indicates information associated with various factors that affect traffic such as traffic conditions for each section (congestion, delay, and the like), accidents, construction work, and the like. For example, the traffic information collect server 230 may collect traffic information directly input by the user with respect to the content POI. As another example, the traffic information collect server 230 may automatically collect traffic information associated with a point of interest corresponding to the content POI or traffic information associated with a region within a predetermined radius based on the point of interest, from among traffic information on the Internet.

The SNS supply server 240 provides social network information related to the user on the Internet. In this example, the social network information indicates information of another user with whom the user sets a relationship (e.g., a neighbor, a friend, and the like), and the information of the other user may include all information for identifying the other user (e.g., an ID, a telephone number, an e-mail address, a blog address, and the like registered in a site related to an open-type POI service system or a map service site).

The POI information database 250 stores and maintains overall map data for a map service, and particularly, stores and maintains an open-type POI collected by the POI collect server 220. The POI information database 250 may store a POI-type POI to be associated with a user who generates a POI and thus, may register the open-type POI generated by the user. Also, the POI information database 250 may store an open-type POI through connection with POI related information input by the user or with POI related information on the Internet.

The traffic information database 260 stores and maintains traffic information associated with a road, which is collected by the traffic information collect server 230. In this example, the traffic information database 260 may store traffic information through connection with location information of a corresponding road so that search and supply of traffic information associated with the content POI may be readily performed.

The SNS database 270 stores and maintains social network information associated with the user, which is collected by the SNS supply server 240. That is, the SNS database 270 may store information of another user with whom the user sets a relationship, to be associated with the user.

With respect to an open-type POI collected by the POI collect server 220, the analysis server 280 verifies at least one of the open-type POI, a user who generates the open-type POI, and POI related information associated with the open-type POI. That is, the analysis server 280 is to manage generation of a poor POI, and performs verification and management by always monitoring a POI generated by a user. For example, when a POI registered by a user corresponds to a facility that is excluded from generation of a POI such as bars and clubs and the like, the analysis server 280 may delete the corresponding POI through monitoring. As another example, the analysis server 280 may monitor whether POI related information (a text, an image, a video, and a voice) does not use a predetermined data form, or includes a swear word or slang, or includes pornography or information associated with spam, or the like, and may delete the corresponding POI. As another example, when a user attempts registration of a poor POI more than a predetermined number of times, when a user is reported as a bad user more than a predetermined number of times, or the like, the analysis server 280 may restrict generation of a POI and the use of the service for the corresponding user. The analysis server 280 may automatically select a POI that fails to correspond to a filtering condition of a data verification system (automatic verification system), as a POI suspected to be a poor POI. In this example, although content that is suspected to be a swear word, slang, pornography, spam, and the like, is not filtered through the data verification system, the content may be separately extracted and may be deleted by determination of a manager. Also, the analysis server 280 may manage a poor POI or a bad user based on a report from a user. After a report associated with a poor POI or a bad user is collected from a user through the analysis server 280, the poor POI may be deleted or the use of the service for the user may be restricted based on determination of the manager. In this example, the POI information database 250 may be built as an open-type POI that is finally verified by the analysis server 280 and the manager.

The management server 290 is a server to manage an overall open-type POI service, and may provide a personalized POI service through an open-type POI based on information stored in the POI information database 250, the traffic information database 260, the SNS database 270, and may also provide a service by connecting the open-type POI with an SNS.

In particular, the management server 290 opens, to a user, map data stored in the POI information database 250, particularly, a POI displayed on a map, so that the user may generate a POI through an open API. The management server 290 provides a web service for opening a POI to a user and for generating a POI, and may register a POI in the POI information database 250 through an open API when a user generates the POI.

Figure 4:
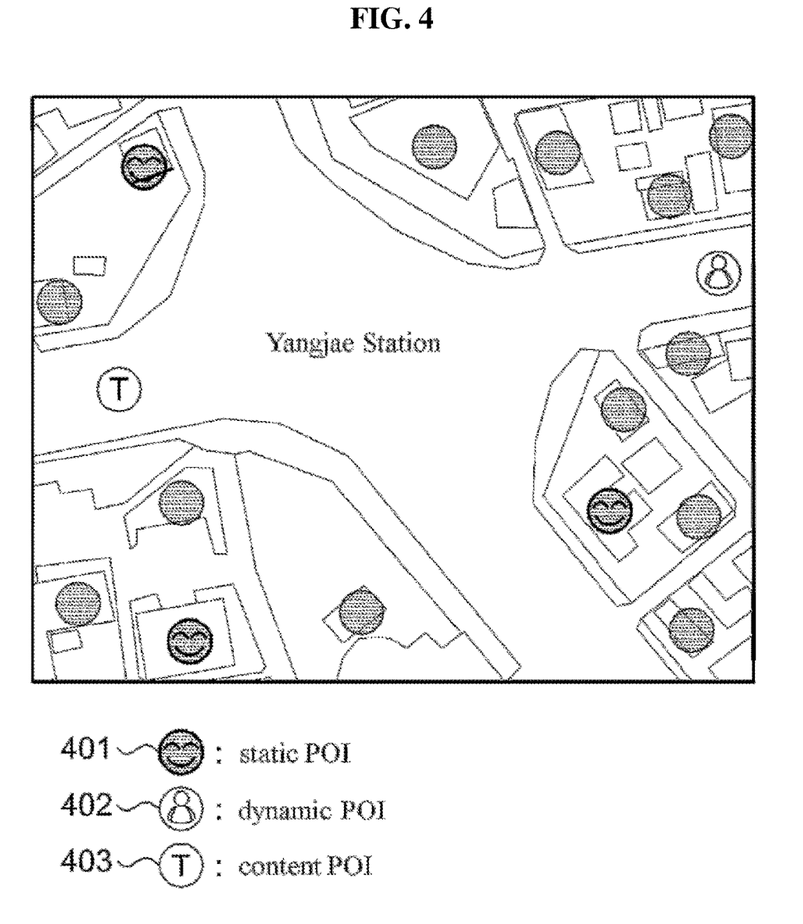
FIG. 4 is a diagram illustrating an open-type POI that is classified into a static POI, a dynamic POI, and a content POI according to an embodiment of the present invention.
Figure 5:
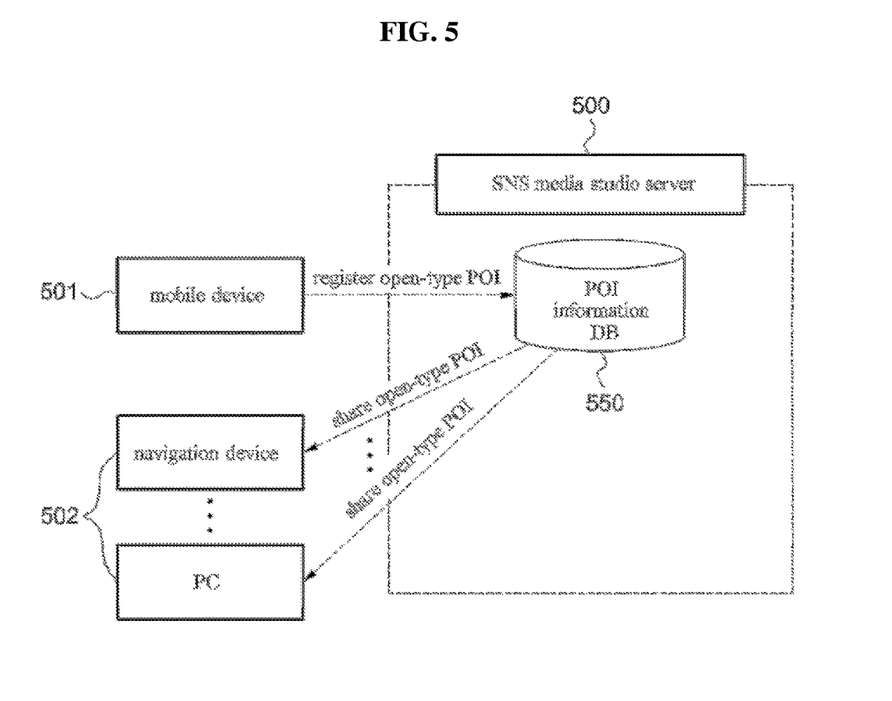
FIG. 5 is a diagram illustrating a personalized POI service in an environment of a different type of device according to an embodiment of the present invention.

Also, the management server 290 may provide a personalized map service through a POI layer extended based on an open-type POI registered by a user. Referring to FIG. 4, the management server 290 may provide an open-type POI including a static POI 401, a dynamic POI 402, and a content POI 403 which are registered by the user on a map screen that is requested by the user. In this example, POI related information associated with an open-type POI may be automatically displayed on a map screen together with a POI, or may be provided in a form of an image or a voice when a user provides an input such as touching an open-type POI and the like. Also, the management server 290 may provide a location of another user designated by a user through the dynamic POI 402 in real-time. The management server 290 provides a service by connecting the content POI 403 with traffic information input by a user or may provide a service by connecting the content POI 403 with traffic information collected on the Internet in real-time. As illustrated in FIG. 5, an SNS media studio server 500 of the present embodiment may share, with a different type of device, a user's open-type POI which is registered in a POI information database 550 through using an open API. When a user registers an open-type POI in a first device 501 (e.g., a mobile device and the like) by viewing a map, the POI may be stored in the POI information database 550 through the open API. Subsequently, when the user turns on a second device 502 (e.g., a navigation device, a PC, and the like) which is in a type different from the first device, or user authentication is performed through the second device 502, the user may download an open-type POI registered in the POI information database 550 and may be provided with a personalized POI service in an environment of a different type of device.

The management server 290 may provide an open-type POI to another user with whom a user sets a relationship, through connection with an open-type POI generated by the user based on an SNS. For example, when the user enables an open-type POI to be connected based on an SNS using an open API, the user may share user's POI with another user whom the user is following. When a user requests providing user's open-type POI from a predetermined friend, or when the friend of the user requests providing user's open-type POI, the user's open-type POI stored in the POI information database 250 may be provided to a corresponding friend. In the present embodiment, an SNS is connected and thus, the POI information database 250 may be shared and may transmit user's open-type POI to other users like sending an e-mail. Also, the management server 290 may share open-type POIs among users and may apply a POI layer received from another user when a map service is provided. The present embodiment uses an open API and thus, may share user's open-type POI with another user who uses a different type of device.

Figure 6:
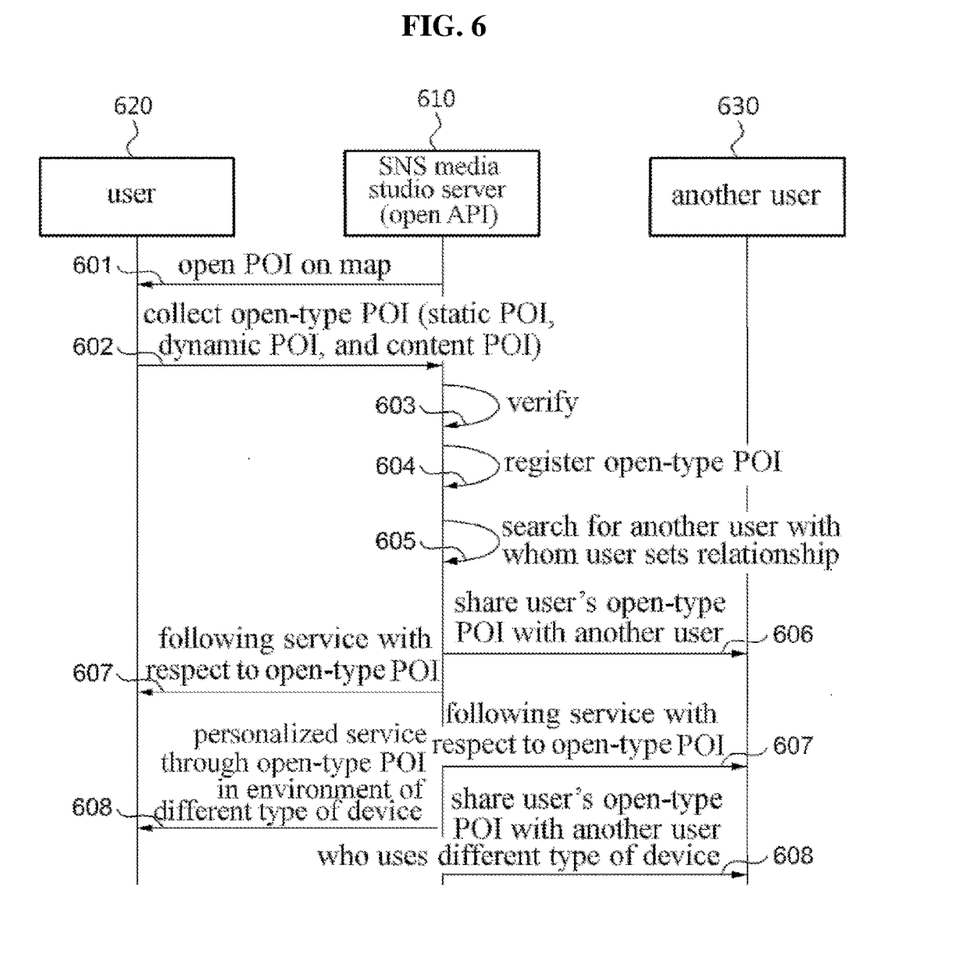
FIG. 6 is a flowchart illustrating an open-type POI service method that provides a social navigation service in which a user directly generates a POI and shares with another user according to an embodiment of the present invention.

FIG. 6 is a flowchart illustrating an open-type POI service method where a user directly generates a POI and shares with another user according to an embodiment of the present invention. Each step of the open-type POI service method according to the present embodiment may be performed through the SNS media studio server 200 that has been described with reference to FIG. 2.

In step 601, the SNS media studio server 200 opens, to a user, a POI displayed on a map so that the user may generate a POI. The SNS media studio server 200 supports a web service that opens a POI on a map so that the user may register a location of interest designated by the user on the map as an open-type POI.

In step 602, the SNS media studio server 200 recognizes the location of interest designated by the user on the map opened in step 601, and collects the recognized location of interest as an open-type POI. Here, the open-type POI may include a static POI, a dynamic POI, and a content POI. For example, when a user selects an interest POI which the user is interested in or changes or adds POI related information associated with a POI, the SNS media studio server 200 may collect the corresponding POI as a static POI. As another example, when a user generates a POI with respect to a location of a predetermined friend through user communication (open API), the SNS media studio server 200 may collect the location of the corresponding friend as a dynamic POI displayed on a map. As another example, when a user generates a POI with respect to a predetermined point that is located in a road or near the road, the SNS media studio server 200 may collect the corresponding point as a content POI displayed on a map. Here, the content POI may correspond to a location for collecting circumjacent traffic information or may correspond to a reference point for providing circumjacent traffic information to a user. Also, in addition to a manual setting method by a user, a content POI may be automatically set with respect to at least one specific point from among an accident black spot, a region for which TPEG data does not exist, and a chronically congested section, and may be collected. Also, the SNS media studio server 200 may collect POI related information directly input by a user and POI related information on the Internet, with respect to an open-type POI. In this example, the POI related information may include traffic information associated with a road, and may be input in at least one form of a text, an image, a video, and a voice. The SNS media studio server 200 may manage the open-type POI by connecting the open-type POI with POI related information.

In step 603, with respect to the open-type POI collected in step 602, the SNS media studio server 200 verifies at least one of the open-type POI, a user who generates the open-type POI, and POI related information associated with the open-type POI. The SNS media studio server 200 always monitors a POI generated by a user, and may delete a POI determined to be poor or may restrict the use of the service for a user who registers a poor POI.

In step 604, the SNS media studio server 200 may complete POI registration by storing the open POI finally verified in step 603 in a POI information database. The SNS media studio server 200 may provide a personalized map service through a POI layer extended based on the open-type POI registered by the user. In this example, the SNS media studio server 200 provides a location of another user designated by the user in real-time through a dynamic POI, or provides traffic information of a point corresponding to a content POI in real-time through the content POI.

In step 605, the SNS media studio server 200 may search for another user with whom the user sets a relationship. The SNS media studio server 200 may collect information associated with the other user with whom the user sets a relationship through social network information associated with the user on the Internet (e.g., an ID, a telephone number, an e-mail address, a blog address, and the like that are registered in an open-type POI service system).

In step 606, the SNS media studio server 200 may provide the open-type POI to the other user with whom the user sets a relationship through connection with the open-type POI generated by the user based on an SNS scheme. The SNS media studio server 200 may provide the open-type POI of the user to the other user in response to a request from the user or a request from the other user with whom the user sets a relationship. Therefore, the SNS media studio server 200 may enable the user to share a POI with the other user with whom the user is following through connection of the open-type POI based on an SNS scheme, and may provide a map service by applying a POI layer that is received from the other user when a map service is provided by sharing POIs among users.

In step 607, the SNS media studio server 200 may share the open-type POI of the user registered in the POI information database among different types of devices using an open API. For example, when a user registers a new POI in a mobile device by viewing a map, and user authentication is performed through a navigation device that is in a type different from the mobile device, the POI newly registered in the POI information database 550 is downloaded to the navigation device and a personalized POI service may be provided in an environment of a different type of device.

In the same manner, in step 608, the SNS media studio server 200 may provide the open-type POI of the user to another user who uses a different type of device using an open API when the user's POI is shared with the other user through an SNS connection.

As described in the foregoing, according to the embodiments of the present invention, a POI on a map is opened to a user so that the user directly generates a POI and thus, any one is capable of generating a POI in a horizontal structure through an open API and a personalized map service may be provided through an extended POI layer. Also, a POI is extended to an object that forms a relationship with a user and a relationship between an individual and a place may be formed and thus, an SNS structure may be provided that provides a connection with another user based on a POI. Also, more reliable data may be collected in real-time by utilizing a POI on a map as a location having real-time data, and the real-time data of a POI may be provided based on an SNS.

The embodiments of the present invention may be recorded in non-transitory computer readable media including program instructions to implement various operations embodied by a computer. The media may also include, alone or in combination with the program instructions, data files, data structures, and the like. The media and program instructions may be those specially designed and constructed for the purposes of example embodiments, or they may be of the kind well known and available to those having skill in the computer software arts. Examples of non-transitory computer readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments.

Therefore the scope of the invention is not limited to the described embodiments and is defined by the claims and their equivalents.

What is claimed is:

1. A point of interest (POI) service system, the system comprising:
 a social network service (SNS) media studio server configured to:
  control to display a POI, which is designated by a first user, on a map;
  retrieve information of a relationship between the first user and a second user through an SNS; and
  set the POI displayed on the map as an open-type POI that is shared with the second user based on the information of the relationship between the first user and the second user,
 wherein the SNS media studio server is further configured to display the second user's POI on the map at a location that changes dynamically and corresponds to a POI of a third user who allows the second user to view the third user's location.

2. The system of claim 1, wherein the POI that is designated by the first user is displayed at a fixed location on the map.

3. The system of claim 1, wherein the POI that is designated by the first user is displayed at a variant location on the map.

4. The system of claim 1, wherein the SNS media studio server is further configured to connect POI related information to the open-type POI when the POI related information is input by the first user with respect to the open-type POI in at least one form of a text, an image, a video, and a voice.

5. A point of interest (POI) service method, the method comprising:
controlling to display a POI, which is designated by a first user, on a map;
retrieving information of a relationship between the first user and a second user through a social network service (SNS);
setting the POI displayed on the map as an open-type POI that is shared with the second user based on the information of the relationship between the first user and the second user; and
displaying the second user's POI on the map at a location that changes dynamically and corresponds to a POI of a third user who allows the second user to view the third user's location.

6. The method of claim 5, wherein a location at which the POI that is designated by the first user, is displayed on the map changes dynamically.

7. The method of claim 5, further comprising connecting POI related information to the open-type POI when the POI related information is input by the first user with respect to the open-type POI in at least one form of a text, an image, a video, and a voice.

8. A terminal device of a first user, wherein the device is configured to:
connect the device to a social network service (SNS) media studio server;
register a point of interest (POI) of the first user as an open-type POI in the SNS media studio server;
receive an open-type POI of a second user from the SNS media studio server in response to the SNS media studio server determining that the second user's POI is shared with the first user based on information of a relationship between the first user and the second user obtained through an SNS; and
display the second user's POI on a map at a location that changes dynamically and corresponds to a location of a third user who allows the second user to view the third user's location.

9. The terminal device of claim 8, wherein:
the device is further configured to display at least one static POI together with at least one dynamic POI on the map,
a location of the static POI is fixed on the map,
a location of the dynamic POI dynamically changes on the map, and
the second user's POI corresponds to the dynamic POI.

10. A method for providing open-type POI service by a terminal device of a first user, the method comprising:
connecting the device to a social network service (SNS) media studio server;
registering a point of interest (POI) of the first user as an open-type POI in the SNS media studio server;
receiving an open-type POI of a second user from the SNS media studio server in response to the SNS media studio server determining that the second user's POI is shared with the first user based on information of a relationship between the first user and the second user obtained through an SNS; and
displaying the second user's POI on a map at a location that changes dynamically and corresponds to a location of a third user who allows the second user to view the third user's location.

11. The method of claim 10, wherein the displaying comprises displaying the second user's POI together with at least one static POI on the map, and
wherein a location of the static POI is fixed on the map.

* * * * *